United States Patent
Coutin et al.

(10) Patent No.: US 12,139,260 B2
(45) Date of Patent: Nov. 12, 2024

(54) AMBIENT AIR ARCHITECTURE WITH SINGLE ACM WITHOUT AN AMBIENT TURBINE

(71) Applicant: Hamilton Sundstrand Corporation, Charlotte, NC (US)

(72) Inventors: Aiden Coutin, Enfield, CT (US); Tony Ho, Glastonbury, CT (US); Louis J. Bruno, Ellington, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 12 days.

(21) Appl. No.: 17/162,516

(22) Filed: Jan. 29, 2021

(65) Prior Publication Data

US 2022/0242580 A1    Aug. 4, 2022

(51) Int. Cl.
*B64D 13/08*    (2006.01)
*B64D 13/02*    (2006.01)
(Continued)

(52) U.S. Cl.
CPC ............. *B64D 13/08* (2013.01); *B64D 13/02* (2013.01); *F02C 6/08* (2013.01);
(Continued)

(58) Field of Classification Search
CPC ........ B64D 13/08; B64D 13/06; B64D 13/02; B64D 13/006; B64D 2013/0618;
(Continued)

(56) References Cited

U.S. PATENT DOCUMENTS 5,086,622 A * 2/1992 Warner .................. B64D 13/06
                                                62/88
5,461,882 A * 10/1995 Zywiak .................. B64D 13/06
                                                62/401
(Continued)

FOREIGN PATENT DOCUMENTS

EP    2862803 A1    4/2015
EP    3480113 A1    5/2019

OTHER PUBLICATIONS

European Partial Search Report; European Application No. 22154355. 6; Date: May 31, 2022; 17 pages.
(Continued)

*Primary Examiner* — Gordon A Jones
(74) *Attorney, Agent, or Firm* — CANTOR COLBURN LLP

(57) ABSTRACT

An environmental control system includes a plurality of inlets for receiving a plurality of mediums including a first medium and a second medium and an outlet for delivering a conditioned flow of the second medium to one or more loads of the aircraft. A ram air circuit includes a ram air shell having at least one heat exchanger positioned therein and a compressing device is arranged in fluid communication with the ram air circuit and the outlet. The compressing device includes a compressor and at least one turbine operably coupled via a shaft. The environmental control system is operable in a first mode and a second mode. In the second mode, a pressure of the second medium output from the compressor is equal to the pressure of the second medium provided to the outlet.

19 Claims, 3 Drawing Sheets

(51) Int. Cl.
*F02C 6/08* (2006.01)
*B64D 13/06* (2006.01)

(52) U.S. Cl.
CPC ............... *B64D 2013/0611* (2013.01); *B64D 2013/0618* (2013.01); *B64D 2013/0648* (2013.01)

(58) Field of Classification Search
CPC .... B64D 2013/0688; B64D 2013/0611; B64D 2013/064; B64D 2013/0644; B64D 2013/0655; B64D 2221/00; B64D 33/02; B64D 33/04; F02C 6/08
See application file for complete search history.

(56) References Cited

U.S. PATENT DOCUMENTS

| | | | |
|---|---|---|---|
| 6,381,969 B1* | 5/2002 | Afeiche | B64D 13/06 62/87 |
| 6,708,517 B1* | 3/2004 | Piao | B64D 13/06 62/324.1 |
| 7,171,819 B2 | 2/2007 | Lui et al. | |
| 9,656,755 B2* | 5/2017 | Durbin | B64D 13/08 |
| 9,657,648 B2 | 5/2017 | Bruno | |
| 10,384,785 B2 | 8/2019 | Bruno et al. | |
| 2004/0177639 A1* | 9/2004 | Army, Jr. | B64D 13/08 62/402 |
| 2004/0194493 A1* | 10/2004 | Army, Jr. | F28D 9/0093 62/402 |
| 2006/0196216 A1* | 9/2006 | Bruno | F25B 9/004 62/402 |
| 2012/0285184 A1* | 11/2012 | Voinov | B64D 13/06 62/401 |
| 2014/0166812 A1* | 6/2014 | Ji | B64D 13/06 165/59 |
| 2015/0314877 A1* | 11/2015 | McAuliffe | B64D 13/06 62/61 |
| 2016/0047561 A1* | 2/2016 | Army, Jr. | B23P 15/26 137/624.27 |
| 2016/0214722 A1* | 7/2016 | McAuliffe | B64D 13/06 |
| 2016/0272329 A1* | 9/2016 | Beers | F25B 9/004 |
| 2018/0215473 A1 | 8/2018 | Army et al. | |
| 2019/0015844 A1* | 1/2019 | Monacchio | A47L 7/0009 |
| 2019/0135440 A1* | 5/2019 | Bruno | B64D 13/06 |
| 2019/0389587 A1* | 12/2019 | Bruno | B64D 13/08 |
| 2021/0001992 A1 | 1/2021 | Ho et al. | |

OTHER PUBLICATIONS

European Extended Search Report; European Application No. 22154355.6; Date: Sep. 2, 2022; 16 pages.
European Office Action for European Application No. 22154355.6; Report Mail Date Jan. 29, 2024 (8 Page).

* cited by examiner

AMBIENT AIR ARCHITECTURE WITH SINGLE ACM WITHOUT AN AMBIENT TURBINE

BACKGROUND

Embodiments of the disclosure relate to environmental control systems, and more specifically to an environmental control system of an aircraft.

Aircraft need to have their internal environment controlled. In general, contemporary air conditioning systems are supplied a pressure at cruise that is approximately 30 psig to 35 psig. The trend in the aerospace industry today is towards systems with higher efficiency. One approach to improve efficiency of an aircraft environmental control system is to eliminate the bleed air entirely and use electrical power to compress outside air. A second approach is to use lower engine pressure. The third approach is to use the energy in the cabin outflow air to compress outside air and bring it into the cabin. Each of these approaches provides a reduction in airplane fuel burn.

BRIEF DESCRIPTION

According to an embodiment, an environmental control system includes a plurality of inlets for receiving a plurality of mediums including a first medium and a second medium and an outlet for delivering a conditioned flow of the second medium to one or more loads of the aircraft. A ram air circuit includes a ram air shell having at least one heat exchanger positioned therein and a compressing device is arranged in fluid communication with the ram air circuit and the outlet. The compressing device includes a compressor and at least one turbine operably coupled via a shaft. The environmental control system is operable in a first mode and a second mode. In the second mode, a pressure of the second medium output from the compressor is equal to the pressure of the second medium provided to the outlet.

In addition to one or more of the features described above, or as an alternative, in further embodiments in the second mode, the pressure of the second medium remains generally constant between an outlet of the compressor and the outlet.

In addition to one or more of the features described above, or as an alternative, in further embodiments the second medium is not provided to the at least one turbine of the compressing device.

In addition to one or more of the features described above, or as an alternative, in further embodiments the plurality of inlets is further configured to receive a third medium.

In addition to one or more of the features described above, or as an alternative, in further embodiments the third medium is only provided to the environmental control system when the environmental control system is in the second mode.

In addition to one or more of the features described above, or as an alternative, in further embodiments the at least one turbine includes a first turbine and a second turbine, and the third medium is provided to only the second turbine.

In addition to one or more of the features described above, or as an alternative, in further embodiments in the second mode, the first medium and the third medium and provided to the second turbine simultaneously.

In addition to one or more of the features described above, or as an alternative, in further embodiments the first medium is provided to only the second turbine when the environmental control system is in the first mode and is provided to the first turbine and the second turbine in series when the environmental control system is in the second mode.

In addition to one or more of the features described above, or as an alternative, in further embodiments the first mode is a low altitude mode.

In addition to one or more of the features described above, or as an alternative, in further embodiments the second mode is a high-altitude mode.

According to another embodiment, an environmental control system includes a plurality of inlets for receiving a plurality of mediums including a first medium, a second medium and an outlet for delivering a conditioned flow of the second medium to one or more loads. A compressing device is in fluid communication with the plurality of inlets and the outlet. The compressing device includes a compressor, a first turbine, and a second turbine operably coupled via a shaft. In a first mode of operation, the compressor of the compressing device is driven by the second turbine, and in a second mode of operation, the compressor of the compressing device is driven by the first turbine and the second turbine. In the second mode of operation, the first medium is provided to the first turbine and the second turbine in series.

In addition to one or more of the features described above, or as an alternative, in further embodiments the first mode of operation is a low altitude mode.

In addition to one or more of the features described above, or as an alternative, in further embodiments the second mode of operation is a high-altitude mode.

In addition to one or more of the features described above, or as an alternative, in further embodiments the plurality of mediums includes a third medium.

In addition to one or more of the features described above, or as an alternative, in further embodiments the third medium is only provided to the environmental control system when the environmental control system is in the second mode of operation.

In addition to one or more of the features described above, or as an alternative, in further embodiments in the second mode of operation, the first medium and the third medium are provided to the second turbine simultaneously.

In addition to one or more of the features described above, or as an alternative, in further embodiments comprising a ram air circuit having a first region and a second region, wherein at least one medium output from the second turbine is provided to the first region.

In addition to one or more of the features described above, or as an alternative, in further embodiments a primary heat exchanger and a condenser are arranged within the ram air circuit, the condenser being arranged within the first region and the primary heat exchanger being arranged within the second region.

In addition to one or more of the features described above, or as an alternative, in further embodiments the primary heat exchanger and the condenser are arranged downstream from the compressor and upstream from the outlet with respect to a flow of the second medium, wherein the second medium is cooled by a first flow within the primary heat exchanger and the second medium is cooled by a second flow within the condenser.

In addition to one or more of the features described above, or as an alternative, in further embodiments the environmental control system is onboard an aircraft.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
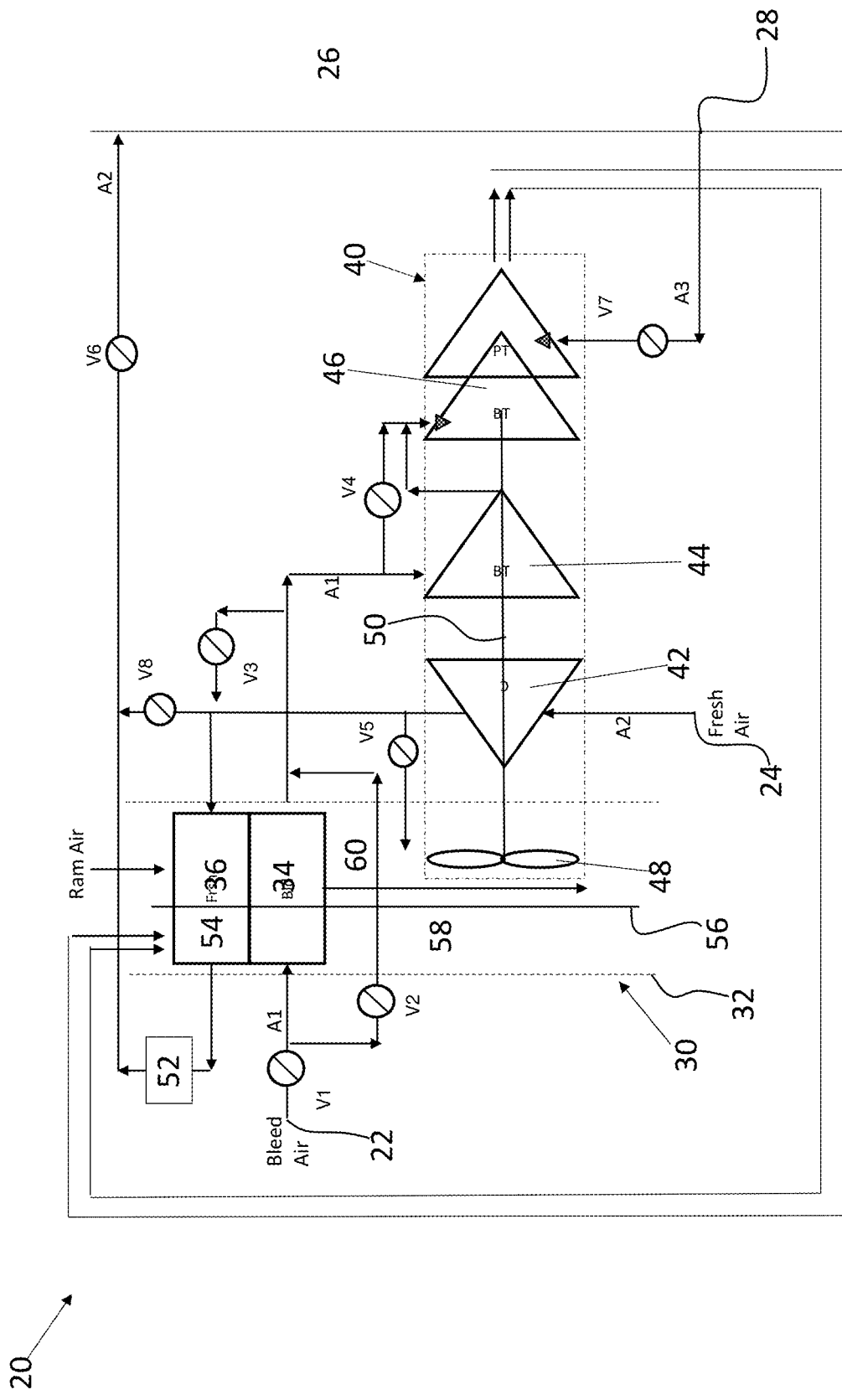
FIG. 1 is a simplified schematic of an environmental control system according to an embodiment.

A detailed description of one or more embodiments of the disclosed apparatus and method are presented herein by way of exemplification and not limitation with reference to the Figures.

Embodiments herein provide an environmental control system of an aircraft that mixes mediums from different sources to power the environmental control system and to provide cabin pressurization and cooling at a high fuel burn efficiency. The medium can generally be air, while other examples include gases, liquids, fluidized solids, or slurries.

With reference now to the FIGS. a schematic diagram of a portion of an environment control system (ECS) 20, such as an air conditioning unit or pack for example, is depicted according to non-limiting embodiments. Although the environmental control system 20 is described with reference to an aircraft, alternative applications are also within the scope of the disclosure. As shown in the FIGS., the system 20 can receive a first medium A1 at a first inlet 22. In embodiments where the environmental control system 20 is used in an aircraft application, the first medium A1 is bleed air, which is pressurized air originating from i.e. being "bled" from, an engine or auxiliary power unit of the aircraft. It shall be understood that one or more of the temperature, humidity, and pressure of the bleed air can vary based upon the compressor stage and revolutions per minute of the engine or auxiliary power unit from which the air is drawn.

The system 20 is also configured to receive a second medium A2 at an inlet 24 and may provide a conditioned form of at least one of the first medium A1 and the second medium A2 to a volume 26. In an embodiment, the second medium A2 is fresh air, such as outside air for example. The outside air can be procured via one or more scooping mechanisms, such as an impact scoop or a flush scoop for example. Thus, the inlet 24 can be considered a fresh or outside air inlet. In an embodiment, the second medium is ram air drawn from a portion of a ram air circuit to be described in more detail below. Generally, the second medium A2 described herein is at an ambient pressure equal to an air pressure outside of the aircraft when the aircraft is on the ground and is between an ambient pressure and a cabin pressure when the aircraft is in flight.

The system 20 can further receive a third medium A3 at an inlet 28. In one embodiment, the inlet 28 is operably coupled to a volume 26, such as the cabin of an aircraft, and the third medium A3 is cabin discharge air, which is air leaving the volume 26 and that would typically be discharged overboard. In some embodiments, the system 20 is configured to extract work from the third medium A3. In this manner, the pressurized air A3 of the volume 26 can be utilized by the system 20 to achieve certain operations.

The environmental control system 20 includes a RAM air circuit 30 including a shell or duct, illustrated schematically in broken lines at 32, within which one or more heat exchangers are located. The shell 32 can receive and direct a medium, such as ram air for example, through a portion of the system 20. The one or more heat exchangers are devices built for efficient heat transfer from one medium to another. Examples of the type of heat exchangers that may be used, include, but are not limited to, double pipe, shell and tube, plate, plate and shell, adiabatic shell, plate fin, pillow plate, and fluid heat exchangers.

The one or more heat exchangers arranged within the shell 32 may be referred to as ram heat exchangers. In the illustrated, non-limiting embodiment, the ram heat exchangers include a first or primary heat exchanger 34 and a second or secondary heat exchanger 36. Within the heat exchangers 34, 36, ram air, such as outside air for example, acts as a heat sink to cool a medium passing through the heat exchanger, for example the first medium A1 and/or the second medium A2.

The system 20 additionally comprises a compressing device 40. Although a single compressing device 40 is illustrated, it should be understood that embodiments including two or more compressing devices are also within the scope of the disclosure. In the illustrated, non-limiting embodiment, the compressing device 40 of the system 20 is a mechanical device that includes components for performing thermodynamic work on a medium (e.g., extracts work from or applies work to the first medium A1, the second medium A2, and/or the third medium A3 by raising and/or lowering pressure and by raising and/or lowering temperature). Examples of a compressing device 40 include an air cycle machine, a two-wheel air cycle machine, a three-wheel air cycle machine, a four-wheel air cycle machine, etc.

Figure 2:
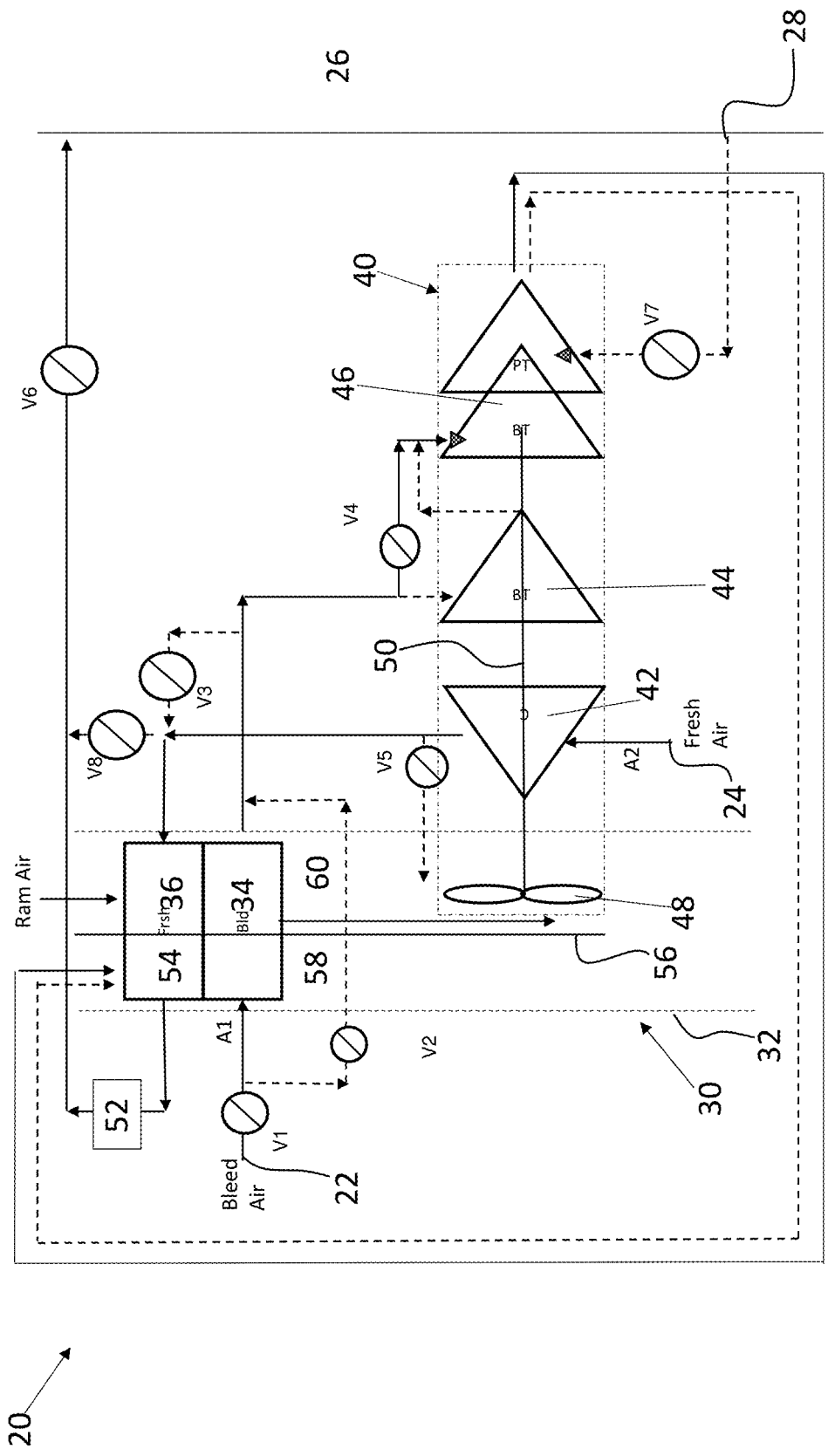
FIG. 2 is a simplified schematic of the environmental control system of FIG. 1. in a first operating mode according to an embodiment.
Figure 3:
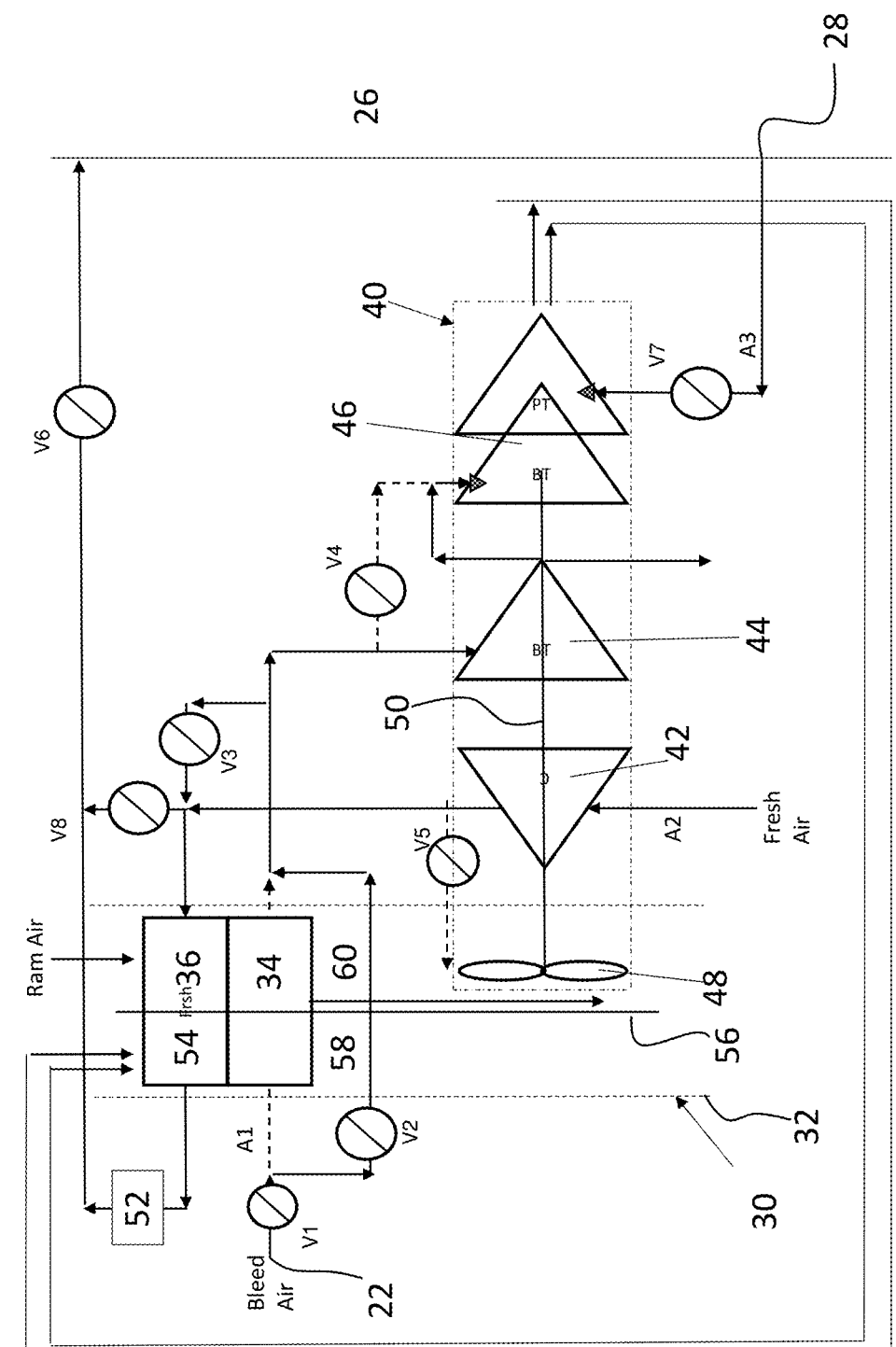
FIG. 3 is a simplified schematic of the environmental control system of FIG. 1 in a second operating mode according to an embodiment.

In the non-limiting embodiment of FIGS. 1-3, the compressing device 40 is a four-wheel air cycle machine including a compressor 42, a first turbine 44, and a second turbine 46 and a fan 48 operably coupled to each other via a shaft 50. The compressor 42 is a mechanical device that raises a pressure of a medium and can be driven by another mechanical device (e.g., a motor or a medium via a turbine). Examples of compressor types include centrifugal, diagonal or mixed-flow, axial-flow, reciprocating, ionic liquid piston, rotary screw, rotary vane, scroll, diaphragm, air bubble, etc. As shown, the compressor 42 is configured to receive and pressurize the second medium A2.

The turbines 44, 46 are mechanical devices that expand a medium and extract work therefrom (also referred to as extracting energy) to drive the compressor 42 via the shaft 50. The first turbine 44 and the second turbine 46 are operable, independently or in combination, to drive the compressor 42 and the fan 48 via the shaft 50. In an embodiment, the second turbine is a dual entry turbine. As shown, the dual entry turbine 46 is configured to receive flows of different mediums. A dual entry turbine typically has multiple nozzles, each of which is configured to receive a distinct flow of medium at a different entry point, such that multiple flows can be received simultaneously. For example, the turbine 46 can include a plurality of inlet flow paths, such as an inner flow path and an outer flow path, to enable mixing of the medium flows at the exit of the turbine 46. The inner flow path can be a first diameter, and the outer flow path can be a second diameter. Further, the inner flow path can align with one of the first or second nozzles, and the outer flow path can align with the other of the first or second nozzles.

The fan 48 is a mechanical device that can force via push or pull methods a medium (e.g., ram air) through the shell 32 across the one or more ram heat exchangers 34, 36 and at a variable cooling flow rate to control temperatures. Although the fan 48 is illustrated as being part of the four-wheel air cycle machine, in other embodiments, the fan 48 may be separate from the compressing device 40 and driven by another suitable means. In such instances, the fan 48 may be electrically driven, may be a tip turbine fan, or may be part of a simply cycle machine.

The system 20 additionally includes a dehumidification system. In the illustrated, non-limiting embodiment of FIG. 1, the dehumidification system includes a water extractor or collector 52 arranged in fluid communication with the second medium A2. The water extractor 52 is a mechanical device that performs a process of removing water from a medium. In an embodiment, the dehumidification system may additionally include a condenser 54 arranged upstream from the water extractor 52. In such embodiments, the condenser 54 may be a separate heat exchanger located downstream from and arranged in fluid communication with an outlet of the second heat exchanger 36.

However, in other embodiments as shown in FIG. 1, the condenser 54 may be connected to or integrally formed with the secondary heat exchanger 36. For example, the second medium A2 is configured to flow through a first portion of the heat exchanger that forms the secondary heat exchanger 36, and then through a second, downstream portion of the heat exchanger, which forms the condenser 54. In such embodiments, although the entire heat exchanger is arranged within the ram air shell 32, a divider 56 wall may extend parallel to the flow of ram air through the shell 32 at the interface between the first and second portions of the heat exchanger to separate the ram air shell 32 into a distinct first region 58 and second region 60. Accordingly, the fan 48 of the compressing device 40 is operable to draw ram air through the second region 60, across the first portion of a heat exchanger that forms a secondary heat exchanger 36 and the primary heat exchanger 34. A fluid flow, distinct from the ram air flow to be described in more detail below, is configured to flow through the first region 58, across the second portion of the heat exchanger that forms the condenser 54. Embodiments where the body of the secondary heat exchanger 36 arranged within the second region 60 is separate and distinct from the condenser 54 arranged within the first region 58 are also within the scope of the disclosure.

The elements of the system 20 are connected via valves, tubes, pipes, and the like. Valves (e.g., flow regulation device or mass flow valve) are devices that regulate, direct, and/or control a flow of a medium by opening, closing, or partially obstructing various passageways within the tubes, pipes, etc. of the system. Valves can be operated by actuators, such that flow rates of the medium in any portion of the system 20 can be regulated to a desired value. For instance, a first valve V1 may be configured to control a supply of the first medium A1 to the system 20, and a second valve V2 may be operable to allow a portion of a medium, such as the first medium A1, to bypass the ram air circuit 30. As a result, operation of the second valve V2 may be used to add heat to the system 20 and to drive the compressing device 40 when needed. A third valve V3 may be operable in the event of a pack failure, such as where the system 20 does not have a sufficient flow of the second medium A2 to meet the demands of the cabin or other loads. In such instances, operation of valve V3 may be used to supplement the flow of second medium A2 with first medium A1, such as at a location upstream from the dehumidification system for example, to meet the demands of the aircraft.

Operation of a fourth valve V4 may be used to allow a portion of the first medium A1 to bypass the first turbine 44 of the compressing device 40. In an embodiment, a fifth valve V5 is a surge control valve, operable to exhaust a portion of the second medium A2 output from the compressor 42 of the compressing device 40 overboard or into the ram air circuit 30 to prevent a compressor surge. A sixth valve V6 is operable to control a flow rate at which the conditioned second medium is provided to the volume 26, which can support temperature control of volume 26, and provide pack backpressure to aid in dehumidification. A seventh valve V7 may be configured to control a supply of a third medium A3 to the second turbine 46 and an eighth valve V8 may be configured to allow a portion of the second medium A2 to bypass the ram air circuit, and therefore a portion of the dehumidification system as well as allow the system 20 to add heat to the conditioned flow provided to one or more loads via an outlet.

With continued reference to FIG. 1 and further reference to FIGS. 2 and 3, the system 20 is operable in a plurality of modes, selectable based on a flight condition of the aircraft. For example, the system 20 may be operable in a first, low altitude mode or a second, high altitude mode. The first, low altitude mode is typically used for ground and low altitude flight conditions, such as ground idle, taxi, take-off, and hold conditions, and the second, high altitude mode may be used at high altitude cruise, climb, and descent flight conditions. During normal operation in both the low altitude mode and the high-altitude mode, only the second medium is provided to one or more loads of the aircraft, including the cabin 26.

With specific reference to FIG. 2, in the first, low altitude mode, valve V1 is open, and a high pressure first medium A1, such as bleed air drawn from an engine or APU, is provided to the ram air circuit 30. As shown in FIG. 2, the hot, high pressure medium is provided to the primary heat exchanger 34. The primary heat exchanger 34 may be arranged within both the first and second regions 58, 60 of the ram air circuit 30, or alternatively, may be wholly positioned within the second region 60 of the ram air circuit 30. Accordingly, the first medium A1 is cooled by at least one medium as it passes through the ram air circuit. Within the portion of the primary heat exchanger 34 disposed within the second region 60 of the ram air circuit 30, the first medium A1 is cooled via a flow of ram air, and within the first, upstream region 58 of the ram air circuit, the first medium A1 is cooled via a flow of another medium, distinct from the ram air.

From the primary heat exchanger 34, the further cooled first medium A1 is provided to an inlet of the second turbine 46 of the first compressing device 40. Because valve V4 is open in a low-altitude mode of operation, the high pressure first medium A1 is configured to bypass the first turbine 44 and is therefore provided directly to the second turbine 46. The first medium A1 is expanded across the turbine 46 and work is extracted therefrom. The first medium A1 output from the turbine 46 has a reduced temperature and pressure relative to the first medium A1 provided to the inlet of the turbine 46. The first medium A1 at the outlet of the turbine 46 may be used to cool the second medium A2 within the condenser 54, to be described in more detail below, and/or to cool the first medium A1 within a portion of the ram air circuit 30. This cooling may occur within the first region 58 of the ram air circuit 30. After receiving heat from the second medium A2 and/or first medium A1 within the first region 58 of the ram air circuit 30, the first medium A1 may be exhausted overboard or outside the aircraft or may be mixed with the ram air within the ram air circuit, for example at a location downstream from the heat exchangers therein. In an embodiment, the divider 56 may extend all the way to an upstream end of the ram air circuit 30 to prevent another medium, separate from the medium output from the turbine 46 of the compressing device 40, from passing through the first region 58 of the ram air circuit 30.

The work extracted form the first medium A1 in the turbine 46 drives the compressor 42, which is used to compress a second medium A2 provided from an aircraft inlet 24. The second medium A2, such as fresh air for example, may be drawn from any suitable source, such as outside the aircraft via a scoop, or alternatively, from an upstream end of the second region 60 of the ram air circuit 30, and provided to an inlet of the compressor 42. The act of compressing the second medium A2 heats the second medium A2 and increases the pressure of the second medium A2.

All or a portion of the second medium A2 output from the compressor 42 is provided to the secondary heat exchanger 36 where it is cooled by a flow of ram air. The second medium A2 exiting the secondary heat exchanger 36 is then provided to the condenser 54, where the second medium A2 is further cooled by the first medium A1 output from the turbine 46. From the condenser 54, the second medium A2 is provided to the water extractor 52 where any free moisture is removed, to produce cool medium pressure air. This cool pressurized second medium A2 then is then sent to one or more loads of the aircraft, such as to condition the volume or cabin 26. In this mode, valve V6 will typically modulate to control flow to the cabin and provide backpressure to aid dehumidification.

With specific reference to FIG. 3, the high-altitude mode of operation is similar to the low altitude mode of operation. However, in the high-altitude mode of operation, valve V4 is closed, valve V2 is open, and valve V7 is modulating for cabin temperature. By opening valve V2, at least a portion of the first medium A1 is configured to bypass the cooling within the ram air circuit. Valve V2 may be operated to control, and in some embodiments, maximize the temperature of the first medium A1 provided to the turbine 44. Further, by closing valve V4, the first medium A1 is provided to the first turbine 44 and the second turbine 46 in series before being delivered to the first region 58 of the ram air circuit 30. Accordingly, work, such as used to drive the compressor 42 and the fan 48, is extracted from the first medium A1 in both the first turbine 44 and the second turbine 46.

The third medium A3, such as exhaust of cabin air for example, is recirculated to the system 20 from the pressurized volume 26, through a valve V7. In the illustrated, non-limiting embodiment, the third medium A3 is provided to an inlet of the second turbine 46, different from the inlet of the second turbine 46 configured to receive a flow of the first medium A1. Within the second turbine 46, the work extracted from both the first medium A1 and the third medium A3 is used to drive the compressor 42 and the fan 48, and therefore move a flow of ram air through the ram air circuit 30, via rotation of the shaft 50. The first and third mediums A1, A3 output from the second turbine 46 may be dumped into the first region 58 of the ram air circuit 30, upstream from the heat exchangers.

The second medium A2 may follow the same flow path with respect to the compressor 42, secondary heat exchanger 36, condenser 54, and water extractor 52 as previously described for the low-altitude mode of operation. Depending on the temperature and humidity conditions of the day, the second medium A2 output from the condenser 54 may be too cold to provide directly to the cabin 26. In such instances, during the high altitude mode of operation, valve V8 may be at least partially opened, thereby allowing a portion of the heated second medium A2 output from the compressor 42 to mix with the cool second medium A2 output from the condenser 54, at a location upstream from an outlet of the system, and in some embodiments, downstream from the water extractor 52. Accordingly, valve V8 can be controlled to achieve a second medium A2 having a desired temperature for conditioning the cabin 26. In this mode, valve V6 will typically be wide open and will not modulate to control flow.

By providing the first medium A1 to the first and second turbine 44, 46 in series, the total amount of work extracted therefrom can be maximized while limiting the pressure ratios required at each turbine 44, 46. Alternatively, in embodiments where valve V4 is open, the first medium A1 output from the heat exchanger 34 may be configured to bypass the first turbine 44. In such embodiments, substantially all of the first medium A1 output from the heat exchanger 34 is provided directly to the second turbine 46.

As used herein, the term "pressure ratio" is intended to describe the ratio of the pressure of the medium provided to an inlet of the turbine and the pressure of the medium provided at the outlet of the turbine. In an embodiment, such as embodiments of the system 20 including a plurality of turbines 44, 46 arranged in series relative to a flow of one or more mediums, the pressure ratio of each of the turbines may be reduced compared to conventional turbines. By using a plurality of turbines having a reduced pressure ratio in series, the energy extracted from the medium within the turbines may be maximized. However, in other embodiments, the pressure ratio of each turbine may be similar to existing turbines. In such embodiments, the system may be capable of maximizing the energy extracted from a medium that has a pressure greater than that of existing mediums. For example, bleed air provided to conventional systems may have a pressure up to about 30 psig. The system 20 described herein may be capable of maximizing energy from a medium having a pressure up to about 60 psig or double the pressure of bleed air in existing systems. Further, the second medium A2, which is the medium provided to the cabin and one or more other loads in every mode of operation of the system 20, is not provided to a turbine within the system 20.

The architecture of an environmental control system 20 as disclosed herein provides 100% non-bleed air to a load, such as the cabin for example, during normal operation. In addition, the system 20 uses cabin outflow air A3 to reduce the amount of bleed air required for operation of the system 20 in certain flight conditions. The second medium A2 provided to the cabin 26 is not configured to pass through a turbine 44, 46 within the environmental control system 20. As a result, in some embodiments, such as during high altitude operation for example, the pressure of the second medium A2 at the outlet of the compressor 42 is generally equal to the pressure of the second medium A2 provided to the outlet (excluding normal pressure losses due to travel within a conduit), or said another way, the pressure of the second medium A2 remains generally constant between the outlet of the compressor 42 and the outlet of the environmental control system 20.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An environmental control system of an aircraft comprising:
    a plurality of inlets for providing a plurality of mediums to the environmental control system, the plurality of inlets including a first inlet for receiving a first medium of the plurality of mediums from a first source and a second inlet for receiving a second medium of the plurality of mediums from a second source;
    an outlet for delivering a conditioned flow of at least one of the plurality of mediums from the environmental control system to one or more loads of the aircraft, the outlet being located downstream from the plurality of inlets, wherein a flow path of the second medium extends from one of the plurality of inlets to the outlet;
    a ram air circuit including a ram air shell having at least one heat exchanger positioned therein; and
    a compressing device arranged in fluid communication with the ram air circuit and the outlet, the compressing device including a compressor and a plurality of turbines operably coupled via a shaft, the plurality of turbines including a first turbine and a second turbine, an outlet of the first turbine being directly fluidly connected to an inlet of the second turbine;
    wherein none of the plurality of turbines of the compressing device are directly fluidly coupled to the flow path of the second medium at a location between the compressor and the outlet.

2. The environmental control system of claim 1, wherein the environmental control system is operable in a first mode and a second mode, and in the second mode, the pressure of the second medium remains generally constant between an outlet of the compressor and the outlet.

3. The environmental control system of claim 1, wherein the plurality of inlets further includes a third inlet is further configured to receive a third medium of the plurality of mediums from a third source.

4. The environmental control system of claim 3, wherein the third medium is only provided to the environmental control system when the environmental control system is in the second mode.

5. The environmental control system of claim 4, wherein the third medium is provided to only the second turbine.

6. The environmental control system of claim 5, wherein in the second mode, the first medium and the third medium are provided to the second turbine simultaneously.

7. The environmental control system of claim 5, wherein the first medium is provided to only the second turbine when the environmental control system is in the first mode and is provided to the first turbine and the second turbine in series when the environmental control system is in the second mode.

8. The environmental control system of claim 4, wherein the first mode is a low altitude mode.

9. The environmental control system of claim 4, wherein the second mode is a high-altitude mode.

10. An environmental control system of comprising:
    a plurality of inlets for receiving a plurality of mediums including a first medium and a second medium;
    an outlet for delivering a conditioned flow of the second medium to one or more loads;
    a compressing device in fluid communication with the plurality of inlets and the outlet, the compressing device having a compressor, a first turbine, and a second turbine operably coupled via a shaft, the first turbine having a first turbine inlet and a first turbine outlet, and the second turbine having a second turbine inlet, the first turbine inlet and the second turbine inlet being arranged in parallel and the first turbine outlet being directly fluidly connected to the second turbine inlet via a conduit, wherein in a first mode of operation, the compressor of the compressing device is configured to be driven by energy extracted from the first medium within the second turbine, and in a second mode of operation, the compressor of the compressing device is configured to be driven by energy extracted from the first medium within both the first turbine and the second turbine, wherein in the second mode of operation, the first medium is provided to the first turbine and the second turbine in series.

11. The environmental control system of claim 10, wherein the first mode of operation is a low altitude mode.

12. The environmental control system of claim 10, wherein the second mode of operation is a high-altitude mode.

13. The environmental control system of claim 10, wherein the plurality of mediums includes a third medium.

14. The environmental control system of claim 13, wherein the third medium is only provided to the environmental control system when the environmental control system is in the second mode of operation.

15. The environmental control system of claim 13, wherein in the second mode of operation, the first medium and the third medium are provided to the second turbine simultaneously.

16. The environmental control system of claim 10, further comprising a ram air circuit having a first region and a second region, wherein at least one medium output from the second turbine is provided to the first region.

17. The environmental control system of claim 16, wherein a primary heat exchanger and a condenser are arranged within the ram air circuit, the condenser being arranged within the first region and the primary heat exchanger being arranged within the second region.

18. The environmental control system of claim 17, wherein the primary heat exchanger and the condenser are arranged downstream from the compressor and upstream from the outlet with respect to a flow of the second medium, wherein the second medium is cooled by a first flow within the primary heat exchanger and the second medium is cooled by a second flow within the condenser.

19. The environmental control system of claim 10, wherein the environmental control system is onboard an aircraft.

* * * * *